United States Patent [19]
Chene

[11] Patent Number: 5,297,453
[45] Date of Patent: Mar. 29, 1994

[54] SNAP RING ACTUATED SINGLE SHAFT SHIFTING MECHANISM

[75] Inventor: William R. Chene, Kalamazoo, Mich.

[73] Assignee: Eaton Corporation, Cleveland, Ohio

[21] Appl. No.: 978,390

[22] Filed: Nov. 18, 1992

[51] Int. Cl.⁵ .............................................. F16H 63/36
[52] U.S. Cl. .................................... 74/477; 74/473 R
[58] Field of Search ................... 74/473 R, 477, 335

[56] References Cited

U.S. PATENT DOCUMENTS

| | | | |
|---|---|---|---|
| 1,726,132 | 8/1929 | Williams | 74/477 |
| 2,027,442 | 1/1936 | Lapsley | 74/477 |
| 3,387,501 | 6/1968 | Frost | 74/477 |
| 3,929,029 | 12/1975 | Kelbel | 74/477 X |
| 4,275,612 | 6/1981 | Silvester | 74/473 R |
| 4,290,515 | 9/1981 | Bogema et al. | 192/53 C |
| 4,445,393 | 5/1984 | Braun | 74/346 |
| 4,503,727 | 3/1985 | Ballendux | 74/477 |
| 4,507,981 | 4/1985 | Hiraiwa et al. | 74/477 |
| 4,584,895 | 4/1986 | Holmes | 74/476 |
| 4,621,537 | 11/1986 | Piazza et al. | 74/477 |
| 4,722,237 | 2/1988 | McNinch, Jr. | 74/346 |
| 4,827,793 | 5/1989 | Loeffler et al. | 74/477 |
| 4,920,815 | 5/1990 | Reynolds | 74/335 |
| 5,085,095 | 2/1992 | Lasoen | 74/473 R |
| 5,101,680 | 4/1992 | Parsons | 74/475 |

FOREIGN PATENT DOCUMENTS 3827571 3/1990 Fed. Rep. of Germany ........ 74/477

Primary Examiner—Allan D. Herrmann
Attorney, Agent, or Firm—Brooks & Kushman

[57] ABSTRACT

An apparatus for selection and engagement of selectable gear ratios in a change speed transmission is disclosed. The apparatus comprises a housing, a shaft mounted for relative axial and rotational movement in the housing, a plurality of shift forks, and a plurality of snap rings. Each of the shift forks includes a hub portion having a bore through which the shaft is received. Each of the snap rings is disposed about the shaft and abuts a corresponding shift fork. Each of the snap rings has a tooth which projects radially from the shaft. Each of the hub portions has a groove which is formed to receive a corresponding tooth such that when one of the grooves is not aligned with a corresponding tooth in response to rotation of the shaft, the other grooves are aligned with a corresponding tooth. Thus, only one shift fork is movable at any time.

9 Claims, 7 Drawing Sheets

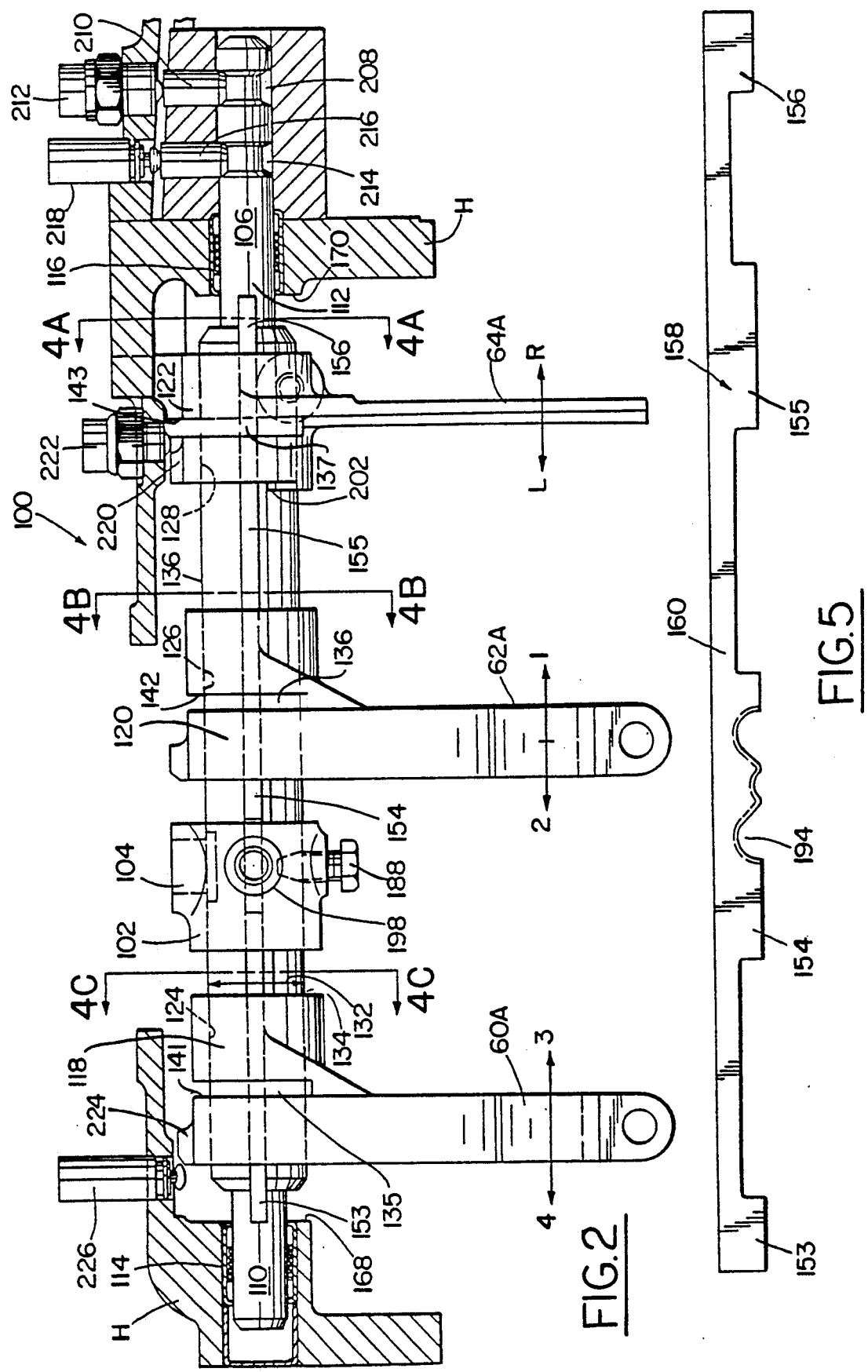

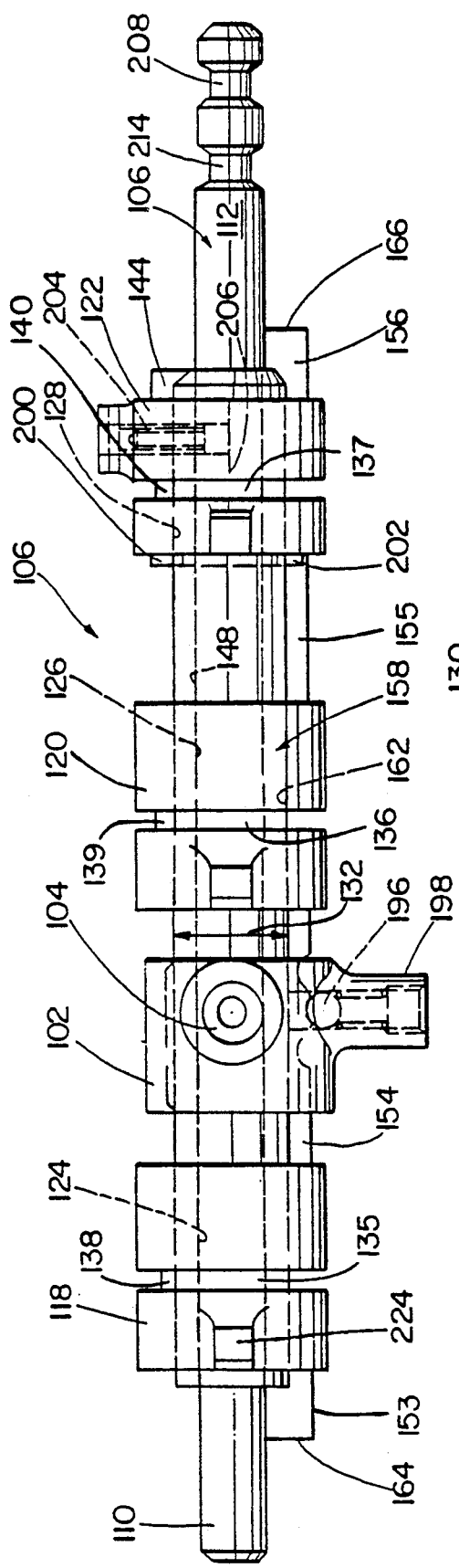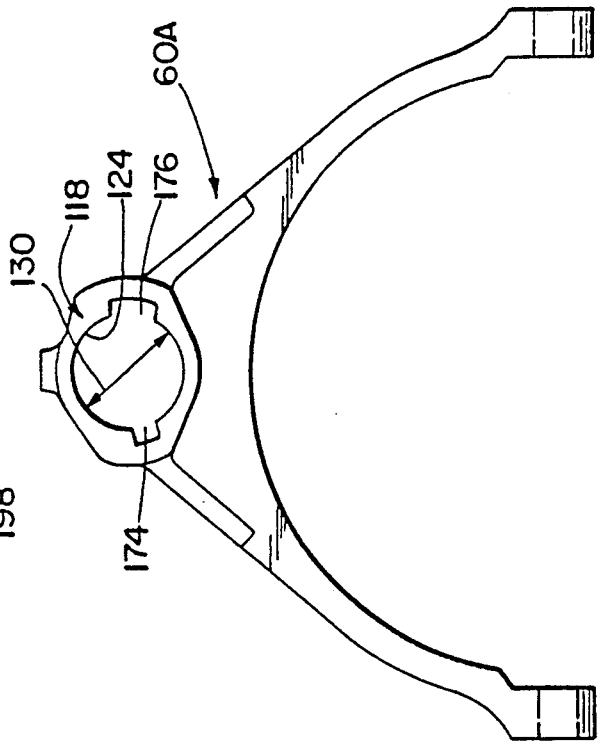

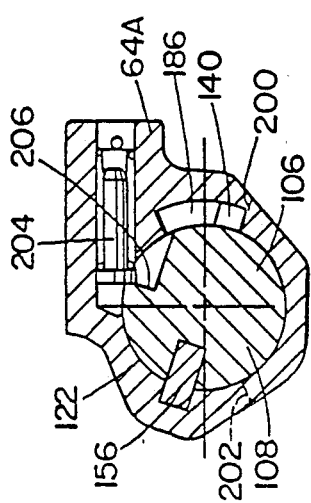
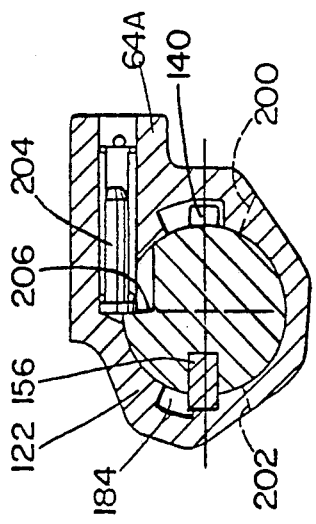
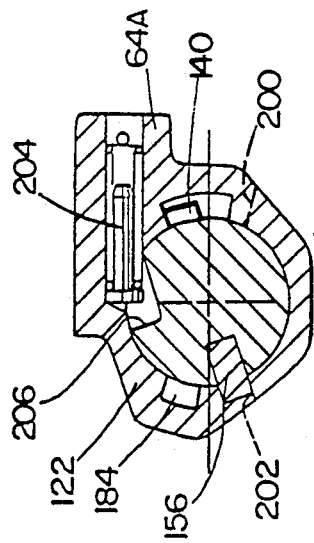
FIG.4A
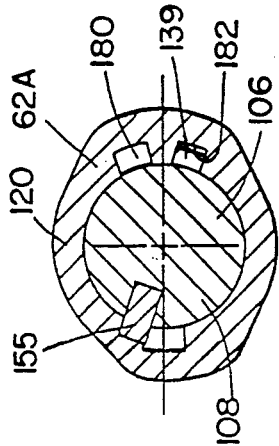
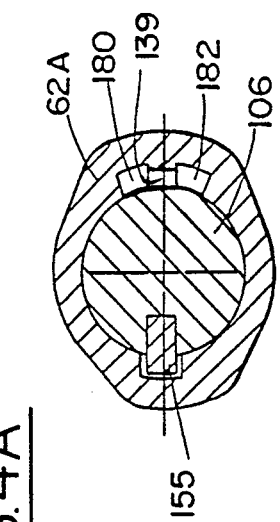
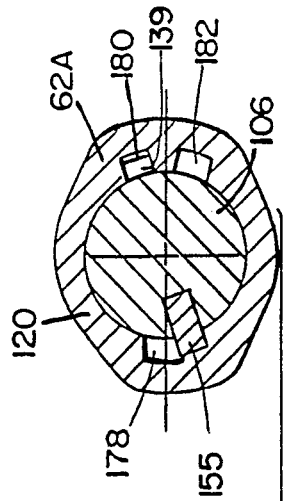
FIG.4B
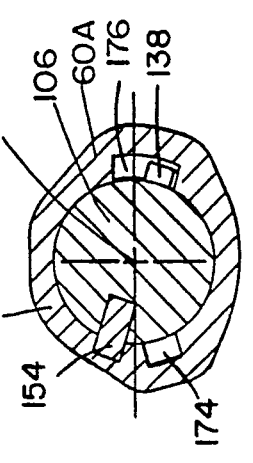
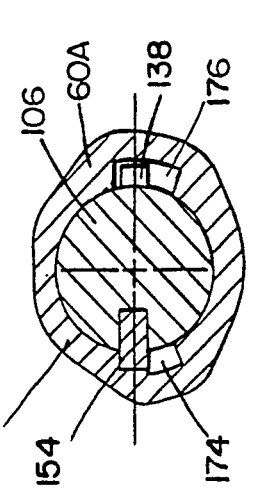
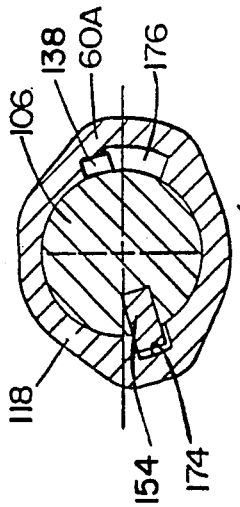
FIG.4C

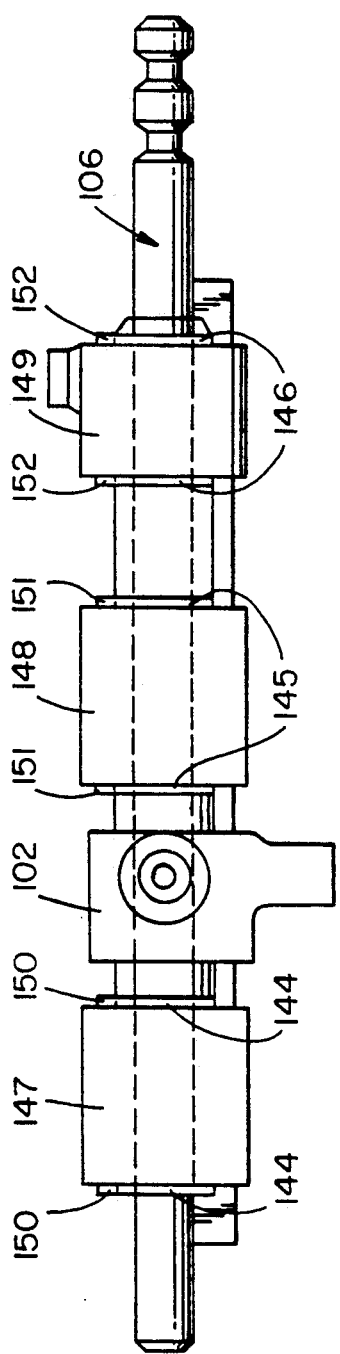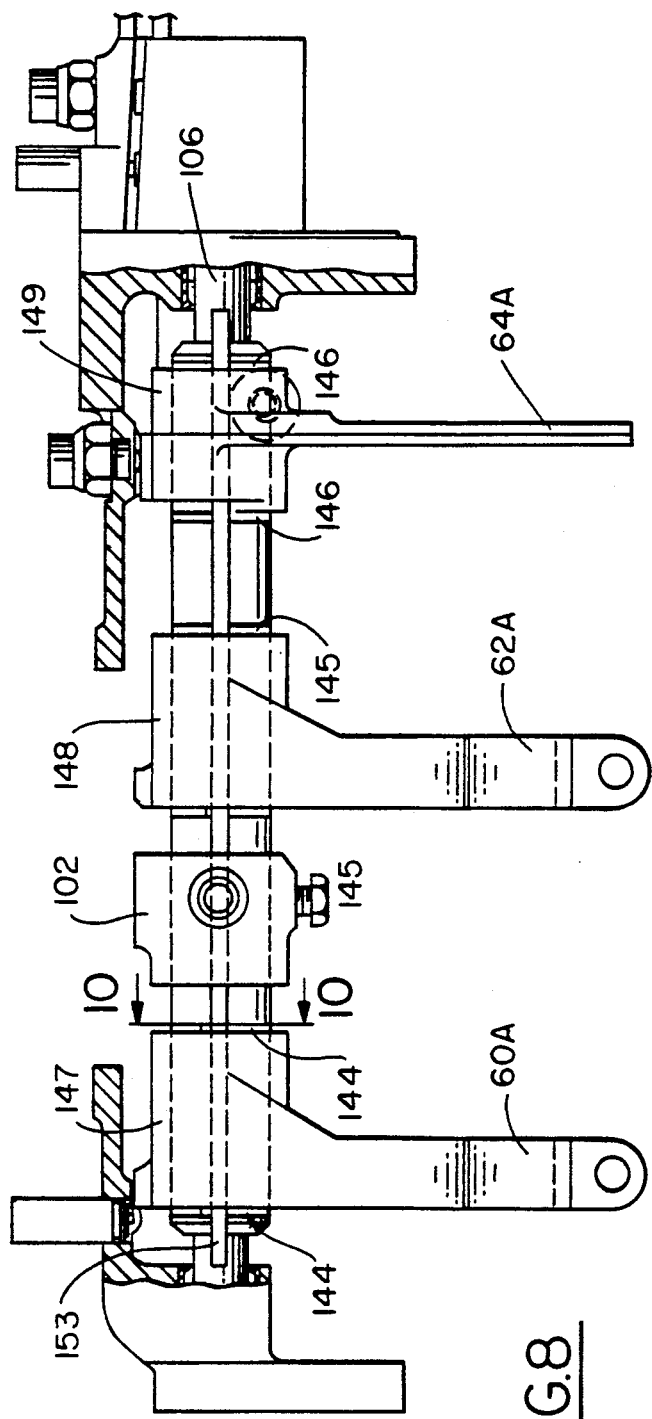
FIG.9
FIG.8

SNAP RING ACTUATED SINGLE SHAFT SHIFTING MECHANISM

TECHNICAL FIELD

The present invention relates to a shifting mechanism for a change gear transmission, or the main transmission section of a compound transmission, of the type wherein selected gear ratios are engaged and disengaged by axially movable gears and/or gear engaging jaw clutch members. In particular, the present invention relates to a shifting mechanism of the type described utilizing a single shift shaft for the selective engagement of three or more gear ratios selectively engageable one at a time.

BACKGROUND ART

Single shaft shifting mechanisms for selecting and engaging the selectable ratios of a multiple speed vehicular mechanical transmission are known in the prior art as may be seen by reference to U.S. Pat. No. 4,621,537 and German Patent No. 1011736, the disclosures of which are hereby incorporated by reference. Such mechanisms are, in certain situations, improvements relative to the multiple parallel shift rail type devices as disclosed in U.S. Pat. Nos. 4,445,393; 4,275,612; 4,584,895 and 4,722,237, the disclosures of which are hereby incorporated by reference, as they require fewer parts, utilize a single moving shaft making the use of improved bearings and finishes more economically feasible, require less space, allow easier control of an auxiliary transmission and/or allow easier more economical sensing of transmission neutral and transmission in-gear conditions.

While the prior art single shaft shifting mechanisms were useful in certain situations, they were not totally satisfactory as the hub or block portions of the various shift forks required multiple axially extending slots cut radially through the hub from the inner diameter to the outer diameter surfaces thereof which could weaken the hubs and which were somewhat difficult and expensive to produce.

Further, the prior art single shaft shifting mechanisms utilized rather complicated cross-shaft mechanisms which included the various detent and stop mechanisms and thus did not allow for easy conversion of the transmission for both direct and remote shifting configurations.

U.S. Pat. No. 4,920,815 to Reynolds, assigned to the assignee of the present invention, addresses these shortcomings in the prior art. Reynolds discloses a single shaft shifting mechanism having two shift keys for contact with hubs and movement of shift forks. While Reynolds is a perfectly acceptable solution to these problems, it would be advantageous to reduce the costs and part complexity required in that design.

SUMMARY OF THE INVENTION

The present invention is an improved apparatus for selection and engagement of selectable gear ratios in a change speed transmission. The apparatus comprises a housing, a shaft mounted for relative axial and rotational movement in the housing, a plurality of shift forks, and a plurality of snap rings. Each of the shift forks includes a hub portion having a bore through which the shaft is received. Each of the snap rings is disposed about the shaft and abuts a corresponding shift fork. Each of the snap rings has a tooth which projects radially from the shaft. Each of the hub portions has a groove which is formed to receive a corresponding tooth such that when one of the grooves is not aligned with a corresponding tooth in response to rotation of the shaft, the other grooves are aligned with a corresponding tooth. Thus, only one shift fork is movable at any given time.

Accordingly, it is an object of the present invention to provide a new and improved snap ring actuated single shaft shifting mechanism.

Another object of the present invention is to provide a mechanism of the type described above in which the costs and part complexity are less than the prior art devices.

These and other objects and advantages of the present invention will become apparent from a reading of the detailed description of the preferred embodiment in connection with the drawings.

BRIEF DESCRIPTION OF THE DRAWINGS

FIG. 2 is a side view of a snap ring actuated single shaft shifting mechanism of the present invention;

FIG. 3 is a top view of the shifting mechanism of the present invention shown in FIG. 2;

FIGS. 4A–4C are a matrix showing the positions of a shaft and three snap rings relative to the various shift hub portions for each selection position of the shifting mechanics of the present invention;

FIG. 5 is a top view of an interlock key;

FIG. 6 is a plan view of a shift fork;

FIG. 8 is a side view of an alternative embodiment of a snap ring activated single shaft mechanism of the present invention;

FIG. 9 is a top view of the alternative embodiment of the shifting mechanism shown in FIG. 8;

BEST MODE FOR CARRYING OUT THE INVENTION

Figure 1:
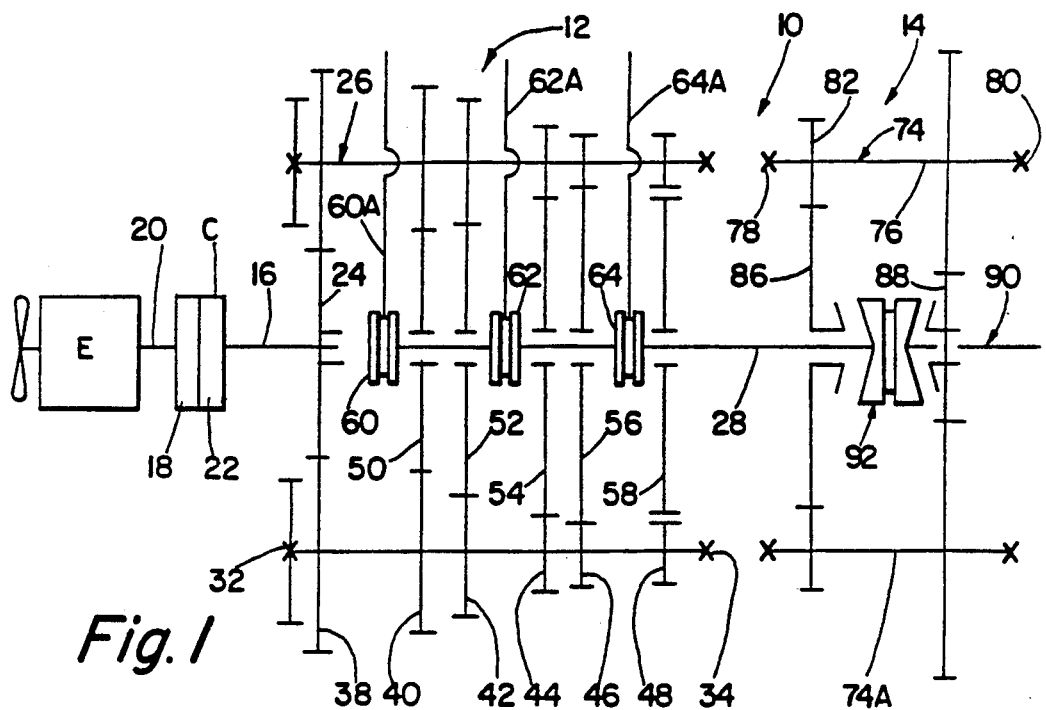
FIG. 1 is a schematic illustration of a compound transmission having a range type auxiliary section.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at a substantially synchronous speed.

The term transmission as used herein shall refer to either a simple transmission or to the main transmission section of a compound transmission.

Figure 1A:
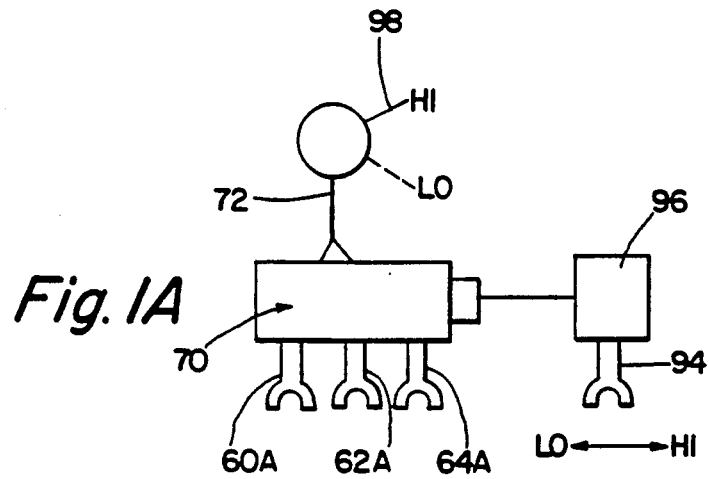
FIG. 1A is a schematic illustration of the transmission of FIG. 1.
Figure 1B:
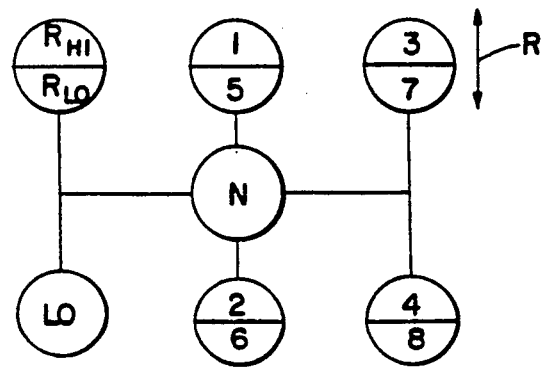
FIG. 1B is a schematic illustration of the shift pattern of the transmission of FIG. 1.
Figure 7:
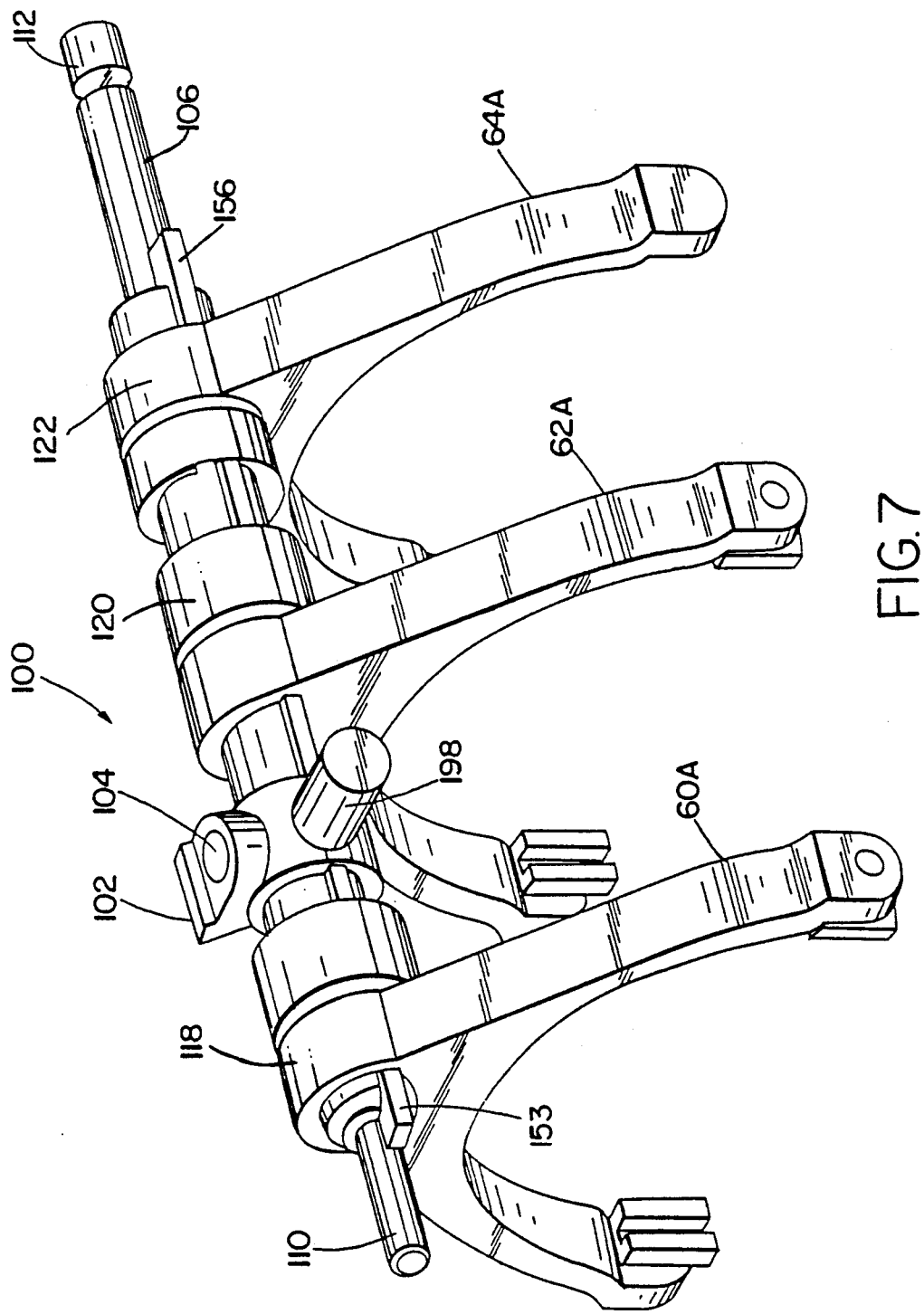
FIG. 7 is a perspective view of the shifting mechanism of the present invention.

Referring to FIGS. 1, 1A and 1B, a range type compound transmission 10 with which the shifting mechanism of the present invention is advantageously utilized is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known acting synchronized or non-synchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, non-engaged position as illustrated, or in a fully rightwardly engaged or fully leftwardly engaged position by means of a shift lever 72. As is well known, only one of the clutches 60, 62 and 64 is engageable at a given time and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork 94 and the range section shifting actuator assembly 96, is provided for clutching either gear 86 to mainshaft 28 for low range operation or gear 88 to mainshaft 28 for direct or high range operation of the compound transmission 10. The shift pattern for compound range type transmission 10 is schematically illustrated in FIG. 1B. Selection of low or high range operation of the transmission 10 is by means of an operator actuated switch or button 98 which is usually located at the shift lever 72. Alternatively, a "double H" type auxiliary shifting device may be utilized.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single counter-shift type.

FIGS. 2-14 show embodiments of the shifting mechanism 100 of the present invention in greater detail. The shifting mechanism 100 includes a block member 102 defining a simple socket 104 for forming a ball and socket type connection with either a direct or remote shifting actuator (not shown). Direct shift actuators, such as shift lever/tower mechanisms utilized with conventional trucks and tractors, and remote shifting actuators of the type utilized with cab-over-engine trucks and tractors, are both well known as may be been by reference to U.S. Pat. Nos. 3,799,002; 3,934,485; 4,290,515; 4,275,612 and 4,543,843, the disclosures of which are hereby incorporated by reference.

The shifting mechanism 100 of the present invention is designed for use on a vehicular transmission, such as transmission 10, comprising a number of selectively engageable gear ratios, each designed to be engaged by axial movement of a clutch member into engagement with a corresponding jaw clutch member by means of shift forks, such as shift forks 60A, 62A, and 64A. The shift forks are effective to axially position a selective one of the clutch collars in opposite axial directions from the centered non-engaged positions thereof as illustrated in FIG. 1.

The shift mechanism 100 includes a shaft 106 mounted in housing H for rotation about, and axial movement along its axis. To this end, shaft 106 is provided with reduced diameter portions 110 and 112. The reduced diameter portions 110 and 112 are optionally mounted on needle roller bearings 114 and 116 provided in the housing H.

Shaft 106 supports the three shift forks 60A, 62A and 64A. Each of the shift forks includes a hub like portion 118, 120, and 122, which are provided with through-bores 124, 126 and 128, respectively, through which the shaft 106 is received. The inner bores are of a diameter 130 slightly greater than the outer diameter 132 of the central portion 134 of shaft 106.

The shift mechanism 100 also includes a plurality of snap rings which are stamped from a mild steel. Each of the snap rings is disposed about the shaft 106 and abuts a corresponding hub portion.

FIGS. 2 and 3 show one embodiment of the present invention in Which snap rings 135, 136 and 137 are disposed between the end surfaces of each of the hub portions in slots 141, 142 and 143 in the hub portions 118, 120 and 122, respectively. The snap rings 135, 136 and 137 fit into circumferential grooves in the shaft 106 which are formed when the shaft is turned. In this embodiment, a tooth 138, 139 and 140 of each respective snap ring 135, 136 and 137 projects radially outwardly from the shaft at the same angle to the horizontal as the other teeth, as described more fully with reference to FIGS. 4A-4C below. The snap rings are preferably about ⅛" thick, but should be at least thick enough to accommodate the stresses to which they are exposed. As an alternative to providing a single relatively thick snap ring in each circumferential groove, two thinner snap rings can be provided to bear the load.

In another embodiment of the present invention shown in FIGS. 8 and 9, snap rings 144, 145 and 146 are disposed against each end surface of each of hub portions 147, 148 and 149. Thus, a pair of snap rings 144 flank the hub portion 147, a pair of snap rings 145 flank the hub portion 148, and a pair of snap rings 146 flank the hub portion 149. Each tooth 150, 151, and 152 of the snap rings 144, 145, and 146, respectively, projects from the shaft 106 at an angle to the horizontal plane different than that of the teeth of the other snap rings, as shown and discussed more fully with reference to FIGS. 10-13 below. As with the embodiment shown in FIGS. 2 and 3, the snap rings 144, 145 and 146 fit into circumferential grooves formed in the shaft 106 to fix them against axial movement relative to the shaft.

Referring again to FIGS. 2 and 3, the shifting mechanism 100 also includes an interlock set of teeth further projecting radially outwardly from the center portion 134 of shaft 106 and being circumferentially fixed thereto but axially movable relative thereto. The interlocking set of teeth are axially movable relative to the shaft 106 and are axially fixed relative to the housing H. Each of the hubs is arranged between two adjacent interlocking teeth. The interlocking set of teeth include teeth 153, 154, 155 and 156. As may be seen by reference to FIG. 5, the interlocking teeth are provided on a single interlocking key 158 having a base portion 160 slidably received in an axially extending groove 162 provided in the shaft 106. As the axially outer ends 164 and 166 of the interlock keys 153 and 156, respectively, are designed to abut with surfaces 168 and 170 of the transmission housing H, all of the interlock teeth defined by key 160 are axially fixed relative to housing H.

Each of the hub portions 118, 120 and 122 of the shift forks 60A, 62A, and 64A, respectively, is provided with a plurality of grooves extending radially outwardly from the inner diameter bore surfaces thereof and extending axially through the entire axial extent of each of the hub portions. Accordingly, the grooves may be provided by the relatively inexpensive and accurate manufacturing technique of broaching.

Each of the grooves is of a dimension such that when circumferentially aligned with a snap ring or the interlock key, the aligned snap ring or interlock key may be received within the groove, allowing relative axial movement between the hub and the aligned tooth.

Hub portion 118 of shift fork 60A, as may be seen by FIG. 6, is provided with a groove 174 and a double width groove 176. Hub portion 120 of shift fork 62A is provided With grooves 178, 180 and 182. Hub portion 122 of shift fork 64A is provided with groove 184 and a double width groove 186.

Axial displacement and rotation of shaft 106 relative to housing H are controlled by a remote or direct shifting actuator (not shown) acting on the socket connector of block member 102 which is axially and rotationally fixed to the shaft 106 as by set screw 188. It is noted that the interlock key 158 carries a plurality of outwardly extendinq, semi-annular recesses 194 for interaction with a spring biased detent ball 196 carried by a detent mechanism 198 of the block member 102 for providing an indication of axial movement of the shaft 106 relative to the housing from the neutral center position thereof to an axially displaced in-gear position thereof. Other than the resilient interaction between the detent ball 196 and the recesses 194, the interlock key 158 is fully axially movable relative to the shaft 106 and the block mechanism 102 axially fixed to shaft 106.

The grooves in the various hub portions of the various shift fork members are arranged such that, for each of the three selection positions of the shifting mechanism 100, the grooves of all of the hub portions except that hub portion to be axially moved are in circumferential misalignment with the interlock teeth while one of the grooves in the hub portion of the shift fork to be axially moved is aligned with the interlock teeth allowing that shift fork to be axially moved relative to the housing. Further, at least one groove in the hub portions of all of the shift forks except that shift fork to be axially moved is aligned with the snap ring teeth allowing the shaft 106 to be axially moved relative to those shift forks while none of the grooves on the hub portion of the shift fork to be axially moved is aligned with the snap ring teeth whereby that shift fork will be axially engaged by the snap ring teeth on both axial sides thereof for axial movement with the shift shaft 106.

The interaction of the various teeth and grooves may be seen by reference to FIGS. 4A-4C. FIGS. 4A-4C define a 3×3 matrix showing the relative positions of the interlock teeth, snap ring teeth and grooves of the hub portions for various operating conditions of the shifting mechanism 100. The first row illustrates hub portion 122 for various rotational positions of shift shaft 106. The second row illustrates hub portion 120 for various rotational positions of shift shaft 106 and the third row illustrates hub portion 118 for the various rotational positions of shift shaft 106. The first column illustrates the position of the shift shaft 106 in the selection position for engaging and disengaging either the reverse or low speed gear ratios. The second column illustrates the position of shift shaft 106 for engaging or disengaging either the first or second speed gear ratios. The third column illustrates the position of shift shaft 106 relative to the various hub portions of the shift shaft in the shift shaft position for engaging or disengaging either third or fourth speed gear ratios. The various views shown in FIGS. 4A–4C are sectional views taken from the rear of the transmission or shifting mechanism as seen in FIG. 1.

By way of example, assuming the operator has rotationally positioned shaft 106 for selection of engagement or disengagement of either first or second speed gear ratios, the shaft 106 will be rotationally positioned as illustrated in the second column. In this position, the interlock teeth 156 and 155 will not be in alignment with groove 184 of the hub portion 122 and thus the shift fork 64A will be axially locked relative to the housing H. Similarly, interlock teeth 154 and 153 will not be in alignment with groove 174 and the shift fork 60A will be axially locked relative to housing H. Interlock teeth 155 and 154 will be axially aligned with groove 178 of hub portion 120 of shift fork 62A allowing shift fork 62A and the clutch member 62 to be axially moved relative to the housing H for engagement or disengagement of either gear 52 or 54 to main shaft 28. Snap ring tooth 140 will align with groove 186 in hub portion 122 and snap ring tooth 138 will align with groove 176 in hub portion 118 allowing the shaft 106 to be axially moved relative to the shift forks 60A and 64A which are now held axially fixed relative to the housing by action of the interlock teeth. Snap ring tooth 139 will not align with either groove 180 or 182 in hub portion 120 of shift fork 62A thereby fixing the shift fork 62A for axial movement with the shaft 106. In a similar manner, as may be seen by reference to the rightward column in FIGS. 4A–4C, rotating the shaft 106 for selecting engagement or disengagement of third or fourth speed ratios result in interlocking hub portions 122 and 120 of shift fork 64A and 62A to the housing while axially fixing hub portion 118 of shift fork 60A to the shaft 106 for axial movement therewith. Also, as may be seen by reference to the leftward most column of FIGS. 4A–4C, rotating the shaft 106 to the position for selecting engagement or disengagement of the low or reverse ratios, will result in interlocking the hub portions 120 and 118 of shift fork 62A and 60A to the housing while axially fixing the hub portion 122 of shift fork 64A to the shaft 106 for axial movement therewith.

While the shift mechanism of the present invention is illustrated in connection with a five forward speed one reverse speed main transmission section 12, such mechanisms could also be utilized with transmissions having a greater number of selectable ratios by the provision of additional shift fork and hub assemblies and proper positioning of the groove in each of the hub assemblies.

As may be seen, hub portion 122 is also provided at its forward end with a pair of axially extending surfaces 200 and 202 which will interact with the snap ring tooth 140 and the interlock tooth 155, respectively, to limit the clockwise and counterclockwise rotation, respectively, of the shaft 106 relative to housing H as viewed from FIG. 4. Briefly, snap ring tooth 140 will engage surface 200 to limit the clockwise rotation of shaft 106 to the position whereat the shaft 106 is correctly positioned for selection of engagement of the low or reverse speed ratios and will thus provide the operator with a positive means of confirming that he has properly reached this position. Similarly, interlocking tooth 155 will engage surface 202 to limit counterclockwise rotation of the shaft 106, as viewed in FIG. 4, to provide the operator with a positive indication that he has correctly positioned the shaft 106 for selection of engagement or disengagement of the third and fourth speed gear ratios. The hub portion 122 is also provided with a spring biased plunger member 204 which will interact with a surface 206 provided on shaft 106. Briefly, as may be seen from the middle column in FIG. 4, spring biased plunger 204 will just engage surface 206 when the shaft 106 is rotationally positioned for proper selection of engaging the first and second speed gear ratios and will thus provide the operator with a positive indication of having properly positioned the shaft 106 for such selection. Further, plunger 204 provides the well known resistance to selection of low and reverse speed and will tend to force the transmission out of such a selection position upon release of the shift lever.

Referring to FIG. 2, the shifting mechanism 100 of the present invention may also include various additional sensors or sensor actuating structures for cooperation with sensing devices provided in the housing as is well known in the prior art. For example, reduced diameter portion 112 of shaft 106 may include a first ramped notch 208 designed to interact with a plunger 210 provided in the housing H to actuate a neutral start safety switch 212. Reduced diameter portion 112 may include a second ramped notch 214 for cooperation with a plunger 216 provided in housing H for the operation of an auxiliary transmission shifting control valve 218. Hub portion 122 of shift fork 128 may include a projection 220 for operation of a reverse of backing light switch 222. Hub portion 118 of shift fork 60A may include a protrusion 224 which will engage a sensor 226 when the shift fork is moved leftwardly as seen in FIG. 2 for engagement of the high speed for operation of a road speed governor valve 226 or the like.

As indicated above, the various in gear, in neutral detent mechanisms, the various stop mechanisms and the mechanisms for indicating that the shaft 106 has been rotated into the various rotational selection positions thereof are all integral with the mechanism 100 allowing the mechanism 100 to be utilized with any standard shift actuator adapted to be received in the socket 104 of block member 102 without requiring any special modifications of the shift actuator mechanism.

Figure 10:
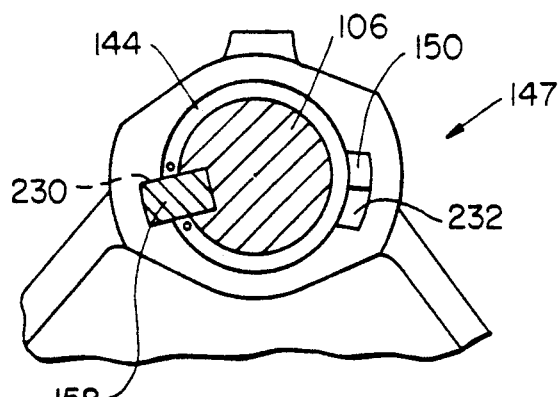
FIG. 10 is a partial plan view taken along line 10—10 in FIG. 8 of a hub portion of the shift fork.
Figure 11:
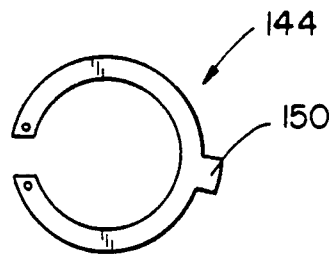
FIG. 11 is a plan view of a snap ring.
Figure 12:
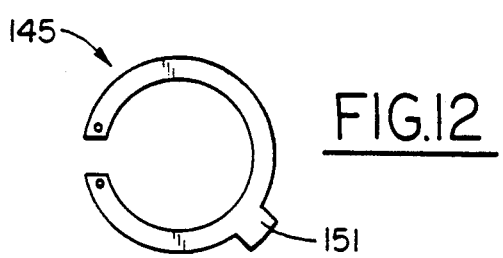
FIG. 12 is a plan view of another snap ring.
Figure 13:
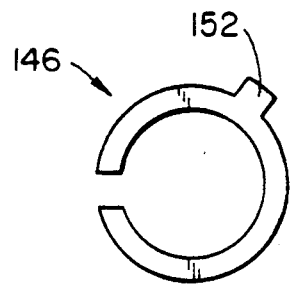
FIG. 13 is a plan view of still another snap ring.

FIG. 10 shows the hub portion 147, which is configured identically to the hub portions 148 and 149. The hub portion 147 is formed with grooves 230 and 232, which are adapted to receive the interlock key 158 and the teeth of the snap rings, respectively. FIGS. 11, 12 and 13 show the snap rings 144, 145 and 146 in which the respective teeth 150, 151 and 152 of each snap ring projects radially from the shaft 106 at an angle different than that of the teeth of the other snap rings. The shift logic, i.e., the interaction of the teeth of the snap rings with the grooves in the hub portions, remains similar to that discussed above with reference to FIGS. 4A–4C. Thus, the snap ring teeth 150 move the hub portion 147 to engage fourth or third gear, the teeth 151 move the hub portion 148 to engage second or first gear, and the teeth 152 move the hub portion 149 to engage first or reverse gear.

Figure 14:
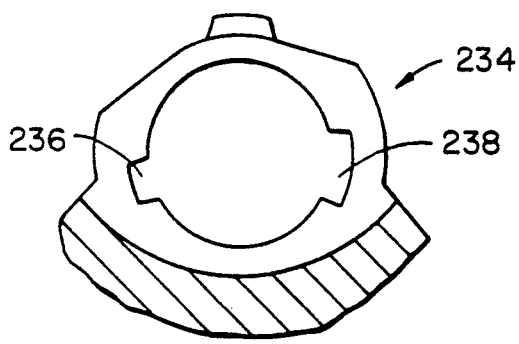
FIG. 14 is a partial plan view of another alternative embodiment of the hub portion of the shift fork.

FIG. 14 shows an alternative embodiment of a hub portion 234 which can be substituted for each of the hub portions 118, 120 and 122 shown in FIGS. 2 and 3. In this embodiment, each of the hub portions 234 has identically configured grooves 236 and 238, as described above with respect to the hub portion 147. The snap rings 144, 145 and 146, when substituted for the snap rings 135, 136 and 137, interact with the grooves 238 as also described with respect to hub portion 147.

Although the present invention has been set forth with a certain degree of particularity, it is understood that various modifications are possible without departing from the spirit and the scope of the invention as hereinafter claimed.

What is claimed is:

1. Apparatus for selection and engagement of selectable gear ratios in a change speed transmission, the apparatus comprising:
    a housing;
    a shaft mounted for relative axial and rotational movement in the housing;
    a plurality of shift forks each including a hub portion, each of the hub portions having a through-bore through which the shaft is received and a pair of axially opposite end surfaces; and
    a plurality of snap rings, each of the snap rings being disposed about the shaft and abutting a corresponding hub portion, each of the snap rings having a tooth projecting radially from the shaft;
    each of the hub portions having a groove extending axially from respective end surfaces thereof, each of the grooves being formed to receive a corresponding tooth such that when one of the grooves is not aligned with a corresponding tooth in response to rotation of the shaft, the other grooves are aligned with a corresponding tooth.

2. The apparatus of claim 1 further comprising a set of interlocking teeth projecting radially from the shaft in an axially-spaced relationship such that each of the hub portions is arranged between two adjacent teeth of the set of interlocking teeth.

3. The apparatus of claim 2 wherein the set of interlocking teeth are axially movable but circumferentially fixed relative to the shaft and axially fixed relative to the housing.

4. The apparatus of claim 1 wherein a snap ring is disposed against each end surface of each of the hub portions.

5. The apparatus of claim 1 wherein a snap ring is disposed between the end surfaces of each of the hub portions.

6. The apparatus of claim 1 wherein the grooves extend completely from axial end surface to axial end surface of each of the hub portions and radially outwardly from an inner diameter bore of the hub portions.

7. The apparatus of claim 1 wherein the tooth of each snap ring projects from the shaft at the same angle.

8. The apparatus of claim wherein the tooth of each snap ring projects from the shaft at an angle different than that of the teeth of the other snap rings.

9. The apparatus of claim 1 further comprising a block member axially and rotationally connected to the shaft, the block member defining a socket-type cavity for receipt of a shift actuator for imparting a selected rotational and axial movement to the shaft.

* * * * *